(12) United States Patent
Terashima (10) Patent No.: US 6,289,436 B1
(45) Date of Patent: Sep. 11, 2001

(54) ASIC CONTROL SYSTEM AND METHOD (75) Inventor: Takeshi Terashima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/198,585

(22) Filed: Nov. 24, 1998

(30) Foreign Application Priority Data

Nov. 26, 1997 (JP) ................................................. 9-324818

(51) Int. Cl.[7] ........................... G06F 12/00; G06K 15/00
(52) U.S. Cl. ................................ 712/36; 712/34; 358/1.1
(58) Field of Search ................... 326/41, 37; 365/189.01, 365/230.01, 230.03, 230.05; 712/34, 36, 38; 399/38, 39, 46; 358/156, 1.1

(56) References Cited

U.S. PATENT DOCUMENTS

| | | | |
|---|---|---|---|
| 5,943,388 | * | 8/1999 | Tümer .................................. 378/98.9 |
| 6,012,137 | * | 1/2000 | Bublil et al. ............................ 712/36 |
| 6,205,245 | * | 3/2001 | Yuan et al. ............................. 382/162 |
| 6,206,506 | * | 3/2001 | Takemura et al. ....................... 347/49 |
| 6,213,584 | * | 4/2001 | Noyes et al. ............................. 347/40 |
| 6,219,153 | * | 4/2001 | Kawanabe et al. .................. 358/1.16 |

FOREIGN PATENT DOCUMENTS 0 919 949 A2 * 6/1999 (EP) .............................. G06K/15/00

* cited by examiner

*Primary Examiner*—Paul V. Kulik
(74) *Attorney, Agent, or Firm*—Sughrue, Mion, Zinn, Macpeak & Seas, PLLC (57) ABSTRACT

An image formation system ASIC control system and method capable of selectively clearing only registers and other storage units, requiring initialization in response to the internal state and external state of an image formation system ASIC are provided. A plurality of reset signals Reset1–Reset3 for clearing predetermined modules 22, 24, and 26 are output from a reset signal selector 14'. To the reset signal selector 14', an internal reset request signal is input from an internal main state machine, a first external reset request signal hw is input from a first external reset request generation source 16 formed of ASIC external hardware, and second external reset request signals sw1, sw2, and sw3 are input from a second external reset request generation source 18 formed of ASIC external software. The reset signal selector 14' ANDs or ORs the input reset requests for outputting any of the reset signals Reset1–Reset3 only to the module corresponding to the reset signal.

8 Claims, 6 Drawing Sheets

| PARAMETER / PROCESSING | INITIALIZATION | VERTICAL POSITION | COLOR | HORIZONTAL POSITION | RESOLUTION | NO. OF HORIZONTAL DOTS | NO. OF VERTICAL DOTS |
|---|---|---|---|---|---|---|---|
| START OF PAGE | →  |  |  |  |  |  |  |
| START OF BAND |  | →  |  |  |  |  |  |
| START OF COLOR |  |  | →  |  |  |  |  |
| END OF COLOR |  |  |  | →  |  |  |  |
| END OF BAND |  |  |  |  | →  | →  |  |
| END OF PAGE |  |  |  |  |  |  | →  |

ASIC CONTROL SYSTEM AND METHOD

BACKGROUND OF THE INVENTION

1. Field of the Invention

This invention relates to a control system and method of an ASIC (application-specific integrated circuit) used with an image formation system and in particular to a control technique of a reset signal in an ASIC for an image formation system.

2. Description of the Related Art

In recent years, image formation systems such as printers, copiers and facsimile machines produce high quality images at high speeds. In such image formation systems, increasingly the tasks of processing the image formation system have been removed from a main CPU and assigned to an ASIC (application-specific integrated circuit) that act as a dedicated coprocessor to the main CPU. The ASIC contains several modules depending on the complexity of the processing flow. Further, several registers are assigned to each module. At the termination of a processing sequence in the ASIC, a specific register needs to be cleared for use in the next processing cycle.

Previously, when a register needs to be cleared, a hardware reset method using an external signal or a software reset method for generating a reset signal by accessing a specific address have been used.

In a hardware reset, if the user stops power supply when voltage falls below a given threshold value, a reset signal is generated by hardware and is supplied to the ASIC from the outside; thereby clearing all the registers in the ASIC.

In the software reset, all the registers in the ASIC can be cleared using a program. A specific register can also be cleared selectively by accessing a specific address.

However, if all the registers in the ASIC are initialized by the hardware or software reset method at the stage of the termination of a processing sequence, registers, buffers, etc., that store data that is required in the next processing is also cleared. In such a case, the registers must be initialized with the same data several times wasting time in the process.

On the other hand, the software reset method allows accessing specific registers as described above. Nevertheless, programming, particularly timing, such a software method is difficult. It also leads to lowering of the processing speed.

SUMMARY OF THE INVENTION

It is therefore an object of the invention to provide an image formation system ASIC control system and method capable of selectively clearing only registers and other data storage units requiring initialization in response to the internal state and external state of an image formation system ASIC. A plurality of signals for resetting predetermined registers and other storage units are provided in the ASIC and are used properly in response to the internal state and external state of the image formation system ASIC.

Thus, the data required for the next processing can be held intact in other data storage sections, so that the data transfer time is shortened. Since a specific data storage section can be selectively cleared according to the provided reset signals, timing design is facilitated and the processing speed in the image formation system does not lower.

To achieve the objectives of the invention there is provided an ASIC control system for an image formation system application-specific integrated circuit (ASIC) comprising a plurality of data storage sections for performing data processing while storing data in the data storage sections, wherein the ASIC control system resets the data storage sections to clear the data stored therein and generates N reset signals, wherein N is an integer equal to or greater than two, for resetting a preselected subset of the plurality of data storage sections.

Preferably the ASIC control system comprises a reset signal generator being installed in the ASIC for generating the N reset signals in response to a change in the internal state of the ASIC.

Still preferably, the reset signal generator comprises an internal reset request generation source for requesting reset responsive to the change in the internal state of the ASIC and a reset signal selector for selecting at least one of the N reset signals based on the reset request from the internal reset request generation source and outputting the selected reset signal to the data storage section corresponding thereto.

Still preferably the internal reset request generation source is a state machine for indicating the internal state of the ASIC.

Further improvements include the ASIC control system further including first external reset request generator being formed of ASIC external hardware for requesting reset of all of the data storage sections.

Preferably the ASIC control system includes a second external reset request generator being formed of ASIC external software for requesting reset of a predetermined one of the data storage sections.

Still preferably the reset signal selector ANDs or ORs an external reset request from the second external reset request generation means and an internal reset request from the internal reset request generation source for outputting a reset signal to the corresponding data storage section.

Another aspect of the present invention is a method for resetting data storage section to clear data stored therein for controlling an ASIC in an image formation system ASIC comprising a plurality of data storage sections for performing data processing while storing predetermined data in the data storage sections, wherein N reset signals for resetting a preselected subset of the data storage sections are used properly in response to an internal state and an external state of the image formation system ASIC, wherein N is an integer greater than 2.

BRIEF DESCRIPTION OF THE DRAWINGS

The above objective(s) and advantage(s) of the present invention will become more apparent by describing in detail a preferred embodiment thereof with reference to the attached drawing(s) in which.

DETAILED DESCRIPTION OF THE INVENTION

Figure 1:
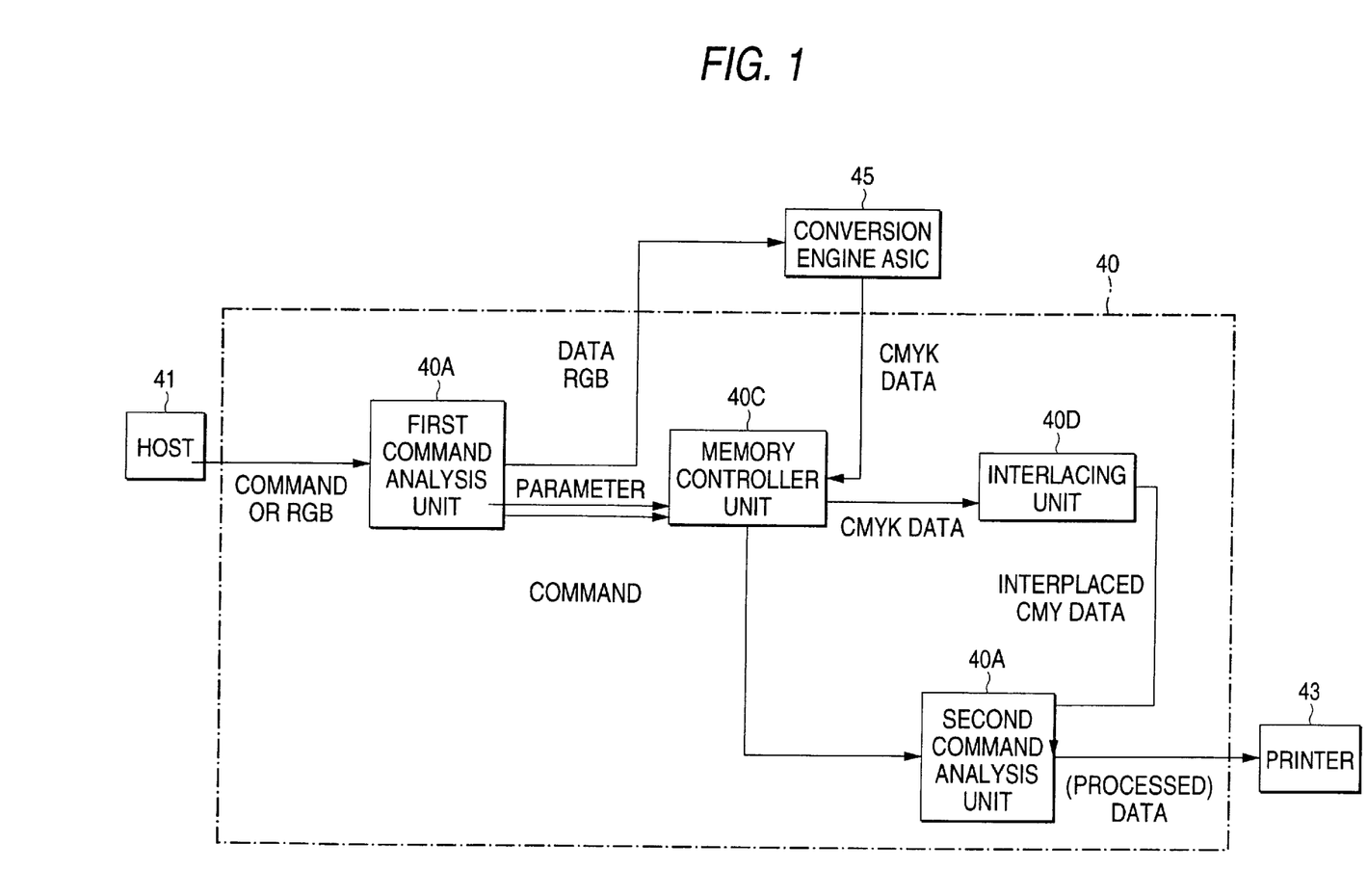
FIG. 1 is a functional block diagram showing the configuration of an interlace processing ASIC for a printer incorporating an ASIC control system according to a first embodiment of the invention.

Referring now to the accompanying drawings, FIG. 1 shows a control system and method of an ASIC for an image formation system according to a first embodiment of the invention.

In the first embodiment, the techniques of the invention are applied to reset signal control in an interlace processing ASIC used in a printer. The interlace processing ASIC is an integrated circuit developed and designed for data preparation processing for interlace drive. Such processing was performed conventionally by a printer driver using software operating on a host.

First, the configuration of the interlace processing ASIC to which the control system and method of the embodiment are applied will be discussed. An interlace processing ASIC 40 to which the control system of the embodiment is applied is placed between a host 41 and a printer 43, for example, on a PCI board, as shown in FIG. 1. The interlace processing ASIC 40 receives, for example, a command and data in a bit image indicated by RGB from the host 41. The ASIC analyzes the command and performs data preparation processing for interlace drive based on CMYK data into which the RGB data is converted by a conversion engine ASIC 45. It then transmits data to the printer 43. The interlace processing ASIC 40 analyzes the data received from the host 41 and sends only the RGB data to the conversion engine ASIC 45.

The conversion engine ASIC 45 is an integrated circuit developed and designed for color conversion (conversion from RGB to CMYK containing binarization and error diffusion). Such processing that drives the hardware was conventionally performed by the above-mentioned printer driver. The conversion engine ASIC 45 converts the RGB data into CMYK data. When receiving the CMYK data from the conversion engine ASIC 45, the interlace processing ASIC 40 performs data preparation processing for interlace drive based on the CMYK data. The ASIC then transmits data together with the command analysis result to the printer 43.

The interlace processing ASIC 40 has a first command analysis unit 40a, a second command analysis unit 40b, a memory controller unit 40c, and an interlacing unit 40d. The first command analysis unit 40a analyzes the command received from the host 41, stores the command data in the memory controller unit 40c, and sends the RGB data to the conversion engine ASIC 45. Various parameters received by the first command analysis unit 40a together with the command data from the host 41 are also stored in the memory controller unit 40c.

The CMYK data into which the RGB data is converted by the conversion engine ASIC 45 is also stored once in the memory controller unit 40c. The command data once stored in the memory controller unit 40c is then sent to the second command analysis unit 40b. The CMYK data once stored in the memory controller unit 40c is sent to the interlacing unit 40d. This data undergoes data preparation processing for interlace drive and is then sent as interlaced CMYK data to the second command analysis unit 40b. The second command analysis unit then processes the command data and the interlaced CMYK data and transmits the processed data to the printer 43.

Figure 2:
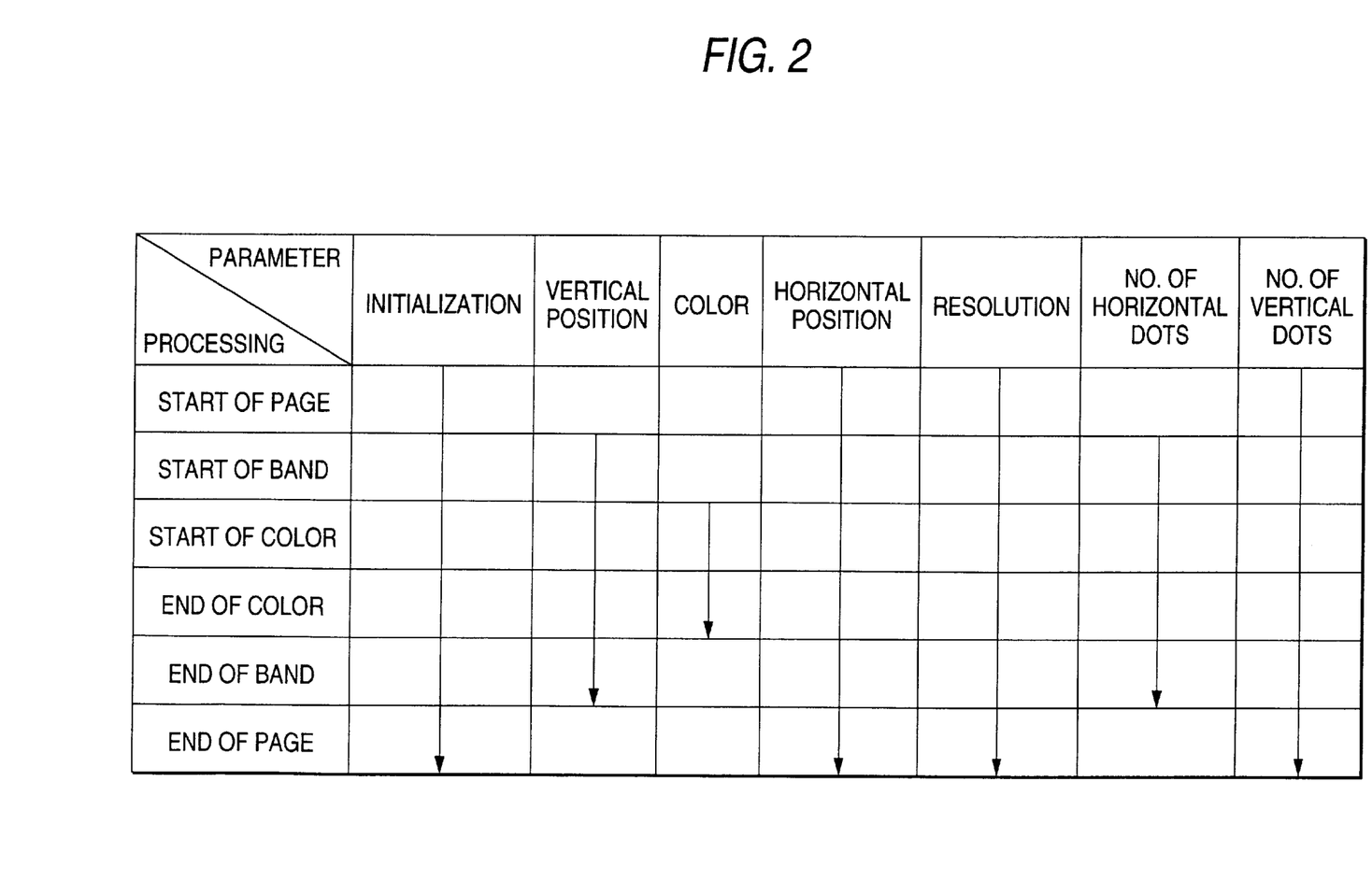
FIG. 2 is a chart showing the relationship between a processing sequence in the ASIC in FIG. 1 and parameters to be held.

The parameters stored in the memory controller unit 40c described above include initialization parameters of page length, page format, print direction specification, vertical position, horizontal direction, color, resolution, number of vertical dots, number of horizontal dots, etc., as shown in FIG. 2. Some of the parameters, such as the initialization parameters of page length, page format, the resolution parameter, etc., do not change if bands change. Some parameters, such as the vertical position parameter, do not change from the start of a band to the end thereof, but get new values on the next band. Further, some other parameters, such as the color parameter, hold the same value only from the start of color to the end thereof.

Figure 3:
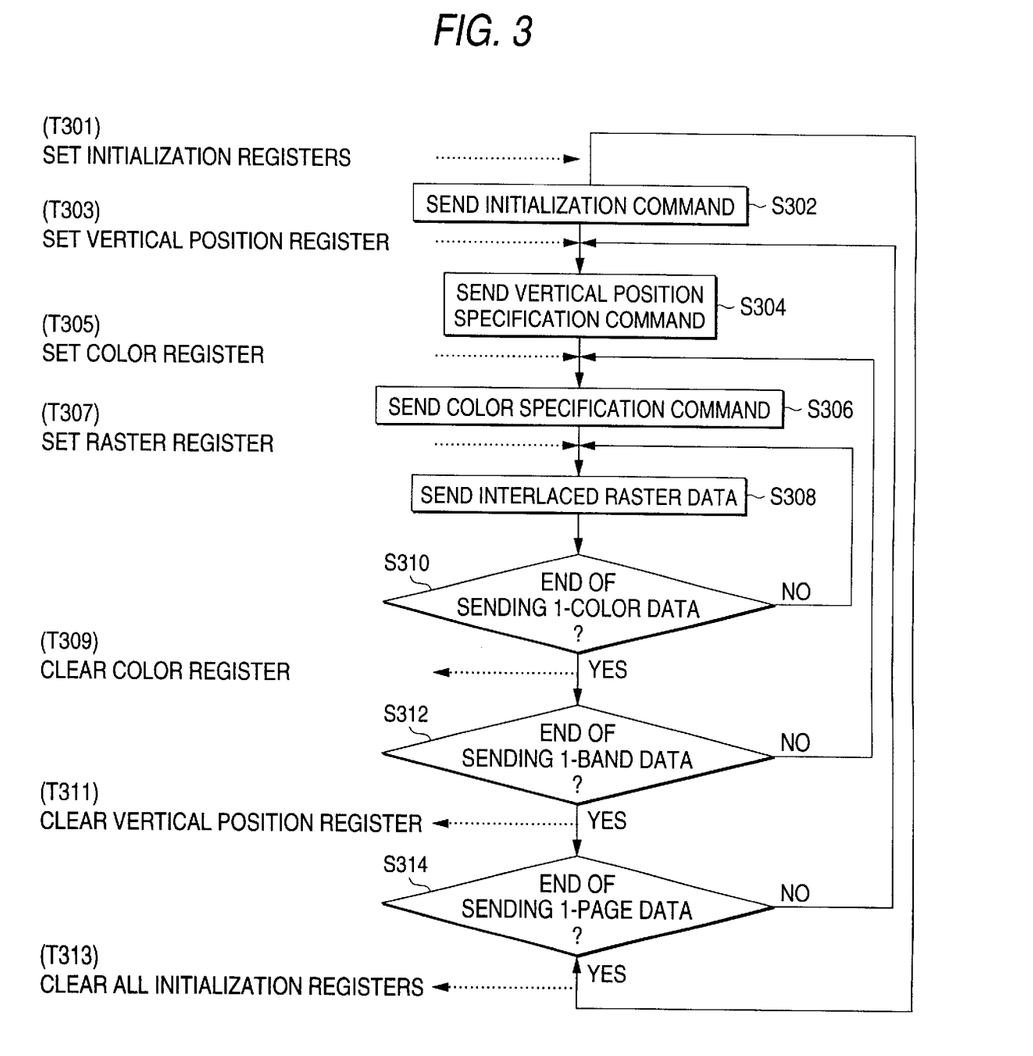
FIG. 3 is a flowchart showing the relationship between each processing separation and register (parameter) set/reset in the ASIC in FIG. 1.

FIG. 3 is a flowchart showing the relationship between timings at which the parameters are set in the registers.

As shown in FIG. 3, initialization registers are set at timing T301 and an initialization command is sent at step S302. The timing is set according to the parameters sent from the host 41. A vertical position register is set at timing T303 and a vertical position specification command is sent at step S304. A color register is set at timing T305 and a color specification command is sent at step S306. Further, a raster register is set at timing T307 and interlaced raster data is sent at step S308. On the other hand, when 1-color data sending (processing) terminates at step S310, the color register is cleared at step S309. When 1-band data sending (processing) terminates at step S312, the vertical position register is cleared at step S311. Further, when 1-page data sending (processing) terminates at step S314, the registers in which the initialization parameters are set are all cleared at step S313.

Figure 4:
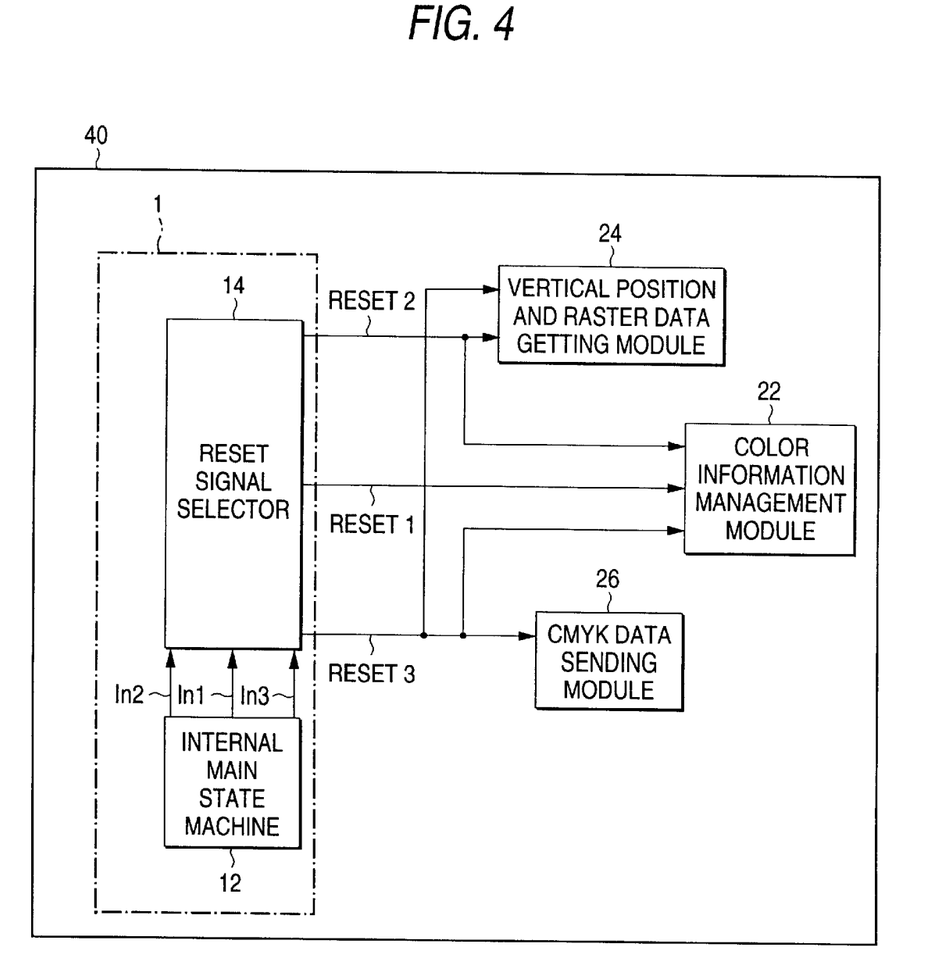
FIG. 4 is a block diagram showing the configuration of the ASIC control system according to the first embodiment of the invention.

FIG. 4 is a functional block diagram illustrating the configuration of the main aspects of the ASIC control system of a preferred embodiment. The ASIC control system of this embodiment is used in conjunction with the interlace processing ASIC 40. To perform above-described interlace processing in the printer 43, the interlace processing ASIC 40 contains several data storage sections. It performs data processing while temporarily storing predetermined data in the data storage sections, then clears the data stored in the data storage sections and performs new data processing while storing new data.

A color information management module 22, a vertical position and raster data getting module 24, and a CMYK data sending module 26 are provided as the data storage sections, as shown in FIG. 4.

As shown in FIG. 4, the ASIC control system 1 of this embodiment is characterized by the fact that it generates N (N=3) reset signals Reset1–Reset3 for resetting predetermined modules. These are the color information management module 22, the module for obtaining the vertical position and raster data 24 and the module to send CMYK data.

That is, as shown in FIG. 4, the ASIC control system 1 is installed in the interlace processing ASIC 40 and consists of an internal main state machine 12 and a reset signal selector 14. The main state machine acts as an internal reset request generation source for making a reset request in response to the internal state transition of the interlace processing ASIC 40. The reset signal selector selects at least one of the three reset signals Reset1–Reset3 based on a reset request made by the internal main state machine 12 and outputs the selected reset signal to the corresponding modules 22, 24 and 26.

The internal main state machine 12 is a type of state machine that indicates the internal state of the interlace processing ASIC 40. The state machine is provided for causing the ASIC to make a state transition or controlling the signal generation timing. It is a pointer indicating the ASIC internal state. The interlace processing ASIC 40 contains a normal state machine (not shown) in addition to the internal main state machine 12.

The internal main state machine 12 generates three internal reset request signals in1, in2, and in3 in response to the internal state transition of the interlace processing ASIC 40. At the termination of processing for each color, processing for each band, and processing for each page, the internal reset request signals in1, in2, and in3 are issued from the internal main state machine 12 and input to the reset signal selector 14.

Figure 5:
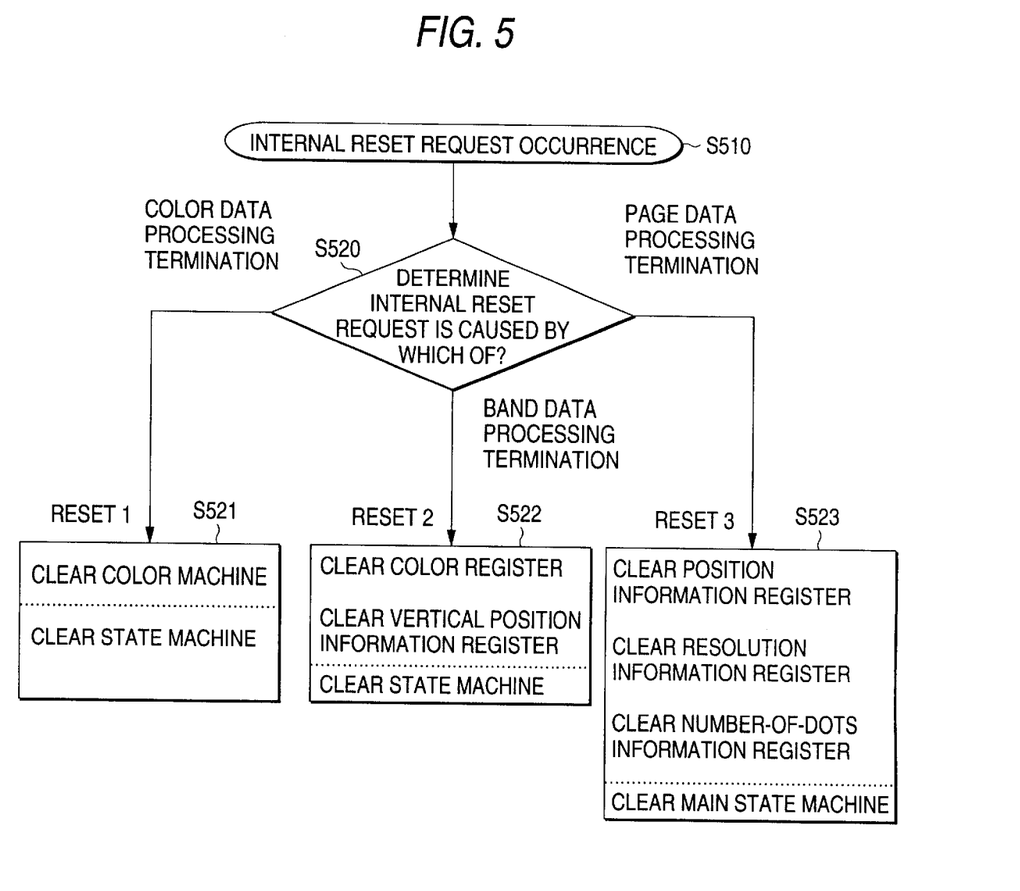
FIG. 5 is a flowchart showing the relationship between reset signals in the ASIC control system in FIG. 4 and registers cleared by the reset signals.

FIG. 5 is a flowchart showing the relationship between generation of the reset signals Reset1–Reset3 in the ASIC control system 1 and the modules reset by the reset signals. Assume that an internal reset request occurs at step S510. In step 520 the cause of the reset is determined from among 1-color data processing, 1-band data processing, and 1-page data processing.

If the reset request is caused by termination of 1-color data processing, the reset signal Reset1 is selected. In such a case only the color information management module 22 is initialized. Specifically, the color register, the state machine, etc., related to the module are cleared at step S521.

If the reset request is caused by termination of 1-band data processing, the reset signal Reset2 is selected. In such a case the color information management module 22 and the vertical position and raster data getting module 24 are initialized. Specifically, the color register, the vertical position information register, the state machine, etc., related to the two modules are cleared at step S522.

Further, if the reset request is caused by termination of 1-page data processing, the reset signal Reset3 is selected. In such a case the color information management module 22, the module 24 that obtains the vertical position and raster data, and the module 26 that sends the CMYK data are all initialized. That is, the position information registers also containing the horizontal position information register, the resolution information register, the number-of-dots information register, etc., in addition to the above-mentioned registers such as the color register are cleared. Because of the termination of 1-page data processing, the internal main state machine 12 is also cleared at step S523.

Next, a control system and method of an ASIC for an image formation system according to a second embodiment of the invention will be discussed with reference to FIG. 6.

Figure 6:
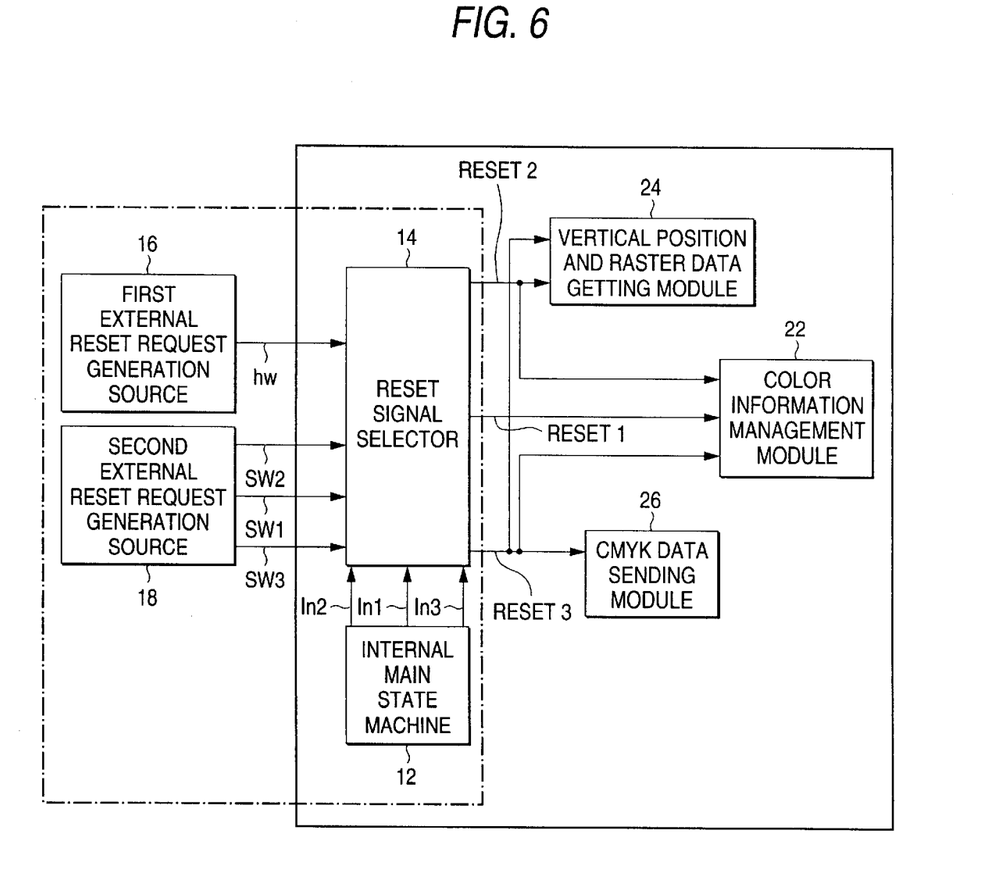
FIG. 6 is a block diagram showing the configuration of an ASIC control system according to a second embodiment of the invention.

FIG. 6 is an example illustrating the use of internal reset requests corresponding to the internal processing state of the ASIC described above and external reset requests caused by hardware or software used in combination.

Parts identical to or similar to those previously described with reference to FIG. 4 are denoted by the same reference numerals in FIG. 6.

The second embodiment is similar to the first embodiment. As shown in FIG. 6, an ASIC control system of the second embodiment of the invention further includes a first external reset request generation source 16 for requesting reset of all of the modules 22, 24 and 26 and a second external reset request generation source 18 for requesting reset of only a predetermined module. A reset signal selector 141 in the ASIC control system is formed of a logical circuit containing logical elements of AND, OR, etc.

The first external reset request generation source 16 is formed of ASIC external hardware. For example, when the hardware detects voltage rising above or falling below a given threshold value as the user turns the power on or off, the first external reset request generation source 16 generates a first external reset request signal hw. When the first external reset request signal hw is supplied from the outside to the reset signal selector 14' in interlace processing ASIC 40, all the registers and other storage units of the interlace processing ASIC 40 are cleared.

That is, when the first external reset request signal hw is input, the reset signal selector 14' selects a reset signal Reset3 for clearing data stored in all of the modules 22, 24 and 26. That is, it is designed for ORing the first external reset request signal hw and any other input and when the first external reset request signal hw is input. It then outputs the reset signal Reset3 to all of the modules 22, 24 and 26. Reset3 clears all the modules 22, 24 and 26

On the other hand, the second external reset request generation source 18 is formed of ASIC external software and generates second external reset request signals sw1, sw2, and sw3 based on software defects, for example.

The reset signal selector 14' is designed for ANDing or ORing the second external reset request 25 signal sw1, sw2, sw3 and internal reset request signal in1, in2, in3 that are output by the main state machine 12. When the second external reset request signal sw1, sw2, or sw3 and the internal reset request signal in1, in2, or in3 from the internal main state machine 12 are input, the reset signal selector 14' outputs the corresponding Reset signal Reset1–Reset3 to modules 22, 24 or 26. Specifically, selection among the second external reset request signals sw1, sw2, and sw3 and the internal reset request signals in1, in2, and in3 in the reset signal selector 14' is as follows:

When none of the second external reset request signals sw1, sw2, and sw3 are input, one of the reset signals Reset1–Reset3 is output to the corresponding module depending on the internal reset request signal in1, in2, in3 output by the internal main state machine 12.

On the other hand, when the second external reset request signal sw1, sw2, or sw3 is input, it is ANDed or ORed with the internal reset request signal in1, in2, in3 output by the internal main state machine 12 and one of the reset signals Reset1–Reset3 is output to the corresponding module in response to the logical operation result. It can also be said that ANDing or ORing defines the priority between the internal reset request signal in1, in2, in3 and the second external reset request signal sw1, sw2, sw3.

In this embodiment, the second external reset request signal sw1, sw2, or sw3 is output if some event occurs when a CPU performs processing in accordance with software (program). Specifically, the second external reset request signal sw1, sw2, sw3 is input to the reset signal selector 14' as follows: For example, when any or all of modules needs to be cleared because of an error, the second external reset request signal sw1 is output.

For example, when any module needs to be cleared when irregular processing needs to be performed during software processing or in any other case than reset by the internal main state machine 12, the second external reset request signal sw2 is output. Further, for example, when the internal main state machine 12 must be forcibly cleared, the second external reset request signal sw3 is output.

As many apparently widely different embodiments of the invention may be made without departing from the spirit and scope thereof, it is to be understood that the invention is not limited to the specific embodiments thereof except as defined in the appended claims.

For example, for simplicity of the description, three reset signals Reset1 to Reset3 are used in the embodiments, but one, two, three, . . . , N (N is an integer of two or greater) reset signals Reset1 to ResetN may be used in response to the number of modules to be cleared or the like.

In the embodiments, the invention is applied to an interlace processing ASIC in a printer as an example of an ASIC for an image formation system, but is also applicable to ASICs used for any other processing if the ASICs are used with image formation systems such as printers. The point is that the invention can also be applied to any other ASIC than the interlace processing ASIC if ASIC processing separation, in other words, the transition of the internal state of the ASIC is clear.

Further, in the embodiments, control examples of interlace processing ASICs placed on PCI boards have been described, but an interlace processing ASIC can be installed in a printer instead. Further, the control system of the interlace processing ASIC can also be installed in the printer.

As seen from the above description a plurality of reset signals for clearing the registers and other storage units in the ASIC are provided and are selected, whereby specific registers can be cleared selectively. Therefore, the registers in which the data to be used also in the next processing is stored are not cleared, so that setting the same data more than once can be avoided. Therefore, the transfer time of the data to be set is also shortened drastically as compared with the former transfer time.

Since a reset signal for clearing a specific register, etc., after the termination of one processing can be generated by the ASIC hardware, programming, particularly, timing design is facilitated and the processing speed of the image formation system is not reduced.

What is claimed is:

1. An ASIC control system for an image formation system application-specific integrated circuit (ASIC) comprising a plurality of data storage sections for performing data processing while storing data in the data storage sections, wherein the ASIC control system resets the data storage sections to clear the data stored therein and generates N reset signals, wherein N is an integer equal to or greater than two, for resetting a preselected subset of the plurality of data storage sections.

2. The ASIC control system of claim 1 comprising a reset signal generator being installed in the ASIC for generating the N reset signals in response to a change in the internal state of the ASIC.

3. The ASIC control system of claim 2 wherein said reset signal generator comprises an internal reset request generation source for requesting reset responsive to the change in the internal state of the ASIC and a reset signal selector for selecting at least one of the N reset signals based on the reset request from the internal reset request generation source and outputting the selected reset signal to the data storage section corresponding thereto.

4. The ASIC control system of claim 3 wherein the internal reset request generation source is a state machine for indicating the internal state of the ASIC.

5. The ASIC control system of claim 1 further including first external reset request generator being formed of ASIC external hardware for requesting reset of all of the data storage sections.

6. The ASIC control system of claim 5 further including second external reset request generator being formed of ASIC external software for requesting reset of a predetermined one of the data storage sections.

7. The ASIC control system of claim 6 wherein the reset signal selector ANDs or ORs an external reset request from the second external reset request generation means and an internal reset request from the internal reset request generation source for outputting a reset signal to the corresponding data storage section.

8. A method for resetting data storage section to clear data stored therein for controlling an ASIC in an image formation system ASIC comprising a plurality of data storage sections for performing data processing while storing predetermined data in the data storage sections, wherein N reset signals for resetting a preselected subset of the data storage sections are used properly in response to an internal state and an external state of the image formation system ASIC, wherein N is an integer greater than 2.

* * * * *